United States Patent [19]

Guthrie et al.

[11] E Patent Number: Re. 33,160

[45] Reissued Date of Patent: Feb. 6, 1990

[54] METHOD AND APPARATUS FOR INSPECTING LATERAL LINES

[75] Inventors: Kenneth R. Guthrie, Orlando, Fla.; James R. Martin, Orangevale, Calif.

[73] Assignee: Cues, Inc., Orlando, Fla.

[21] Appl. No.: 125,578

[22] Filed: Nov. 25, 1987

Related U.S. Patent Documents

Reissue of:

[64] Patent No.: 4,651,558
Issued: Mar. 24, 1987
Appl. No.: 776,163
Filed: Sep. 13, 1985

[51] Int. Cl.[4] ..... H04N 7/18
[52] U.S. Cl. ..... 73/40.5 R; 358/100
[58] Field of Search ..... 138/93, 94; 285/93; 358/100, 106; 73/40.5 R, 40

[56] References Cited

U.S. PATENT DOCUMENTS

| | | | |
|---|---|---|---|
| 2,909,975 | 10/1959 | Ulrich | 73/40.5 R X |
| 2,971,259 | 2/1961 | Hahnau et al. | 73/40.5 R X |
| 3,400,574 | 9/1968 | Cramer | 73/40.5 R |
| 3,750,711 | 8/1973 | Conklin et al. | 73/40.5 R |
| 3,885,091 | 5/1975 | Fish et al. | 358/113 X |
| 3,958,607 | 5/1976 | Gray | 138/93 X |
| 4,107,738 | 8/1978 | Van Norman | 358/100 |
| 4,246,604 | 1/1981 | Hundertmark et al. | 358/100 |
| 4,286,287 | 8/1981 | Williams | 358/100 |
| 4,432,931 | 2/1984 | Lockett | 358/100 |
| 4,484,602 | 11/1984 | Guthrie | 138/93 |
| 4,677,472 | 6/1987 | Wood | 358/100 |

FOREIGN PATENT DOCUMENTS

| | | | |
|---|---|---|---|
| 2734556 | 2/1979 | Fed. Rep. of Germany | 33/1 H |
| 2908351 | 9/1980 | Fed. Rep. of Germany | 73/432 B |

*Primary Examiner*—Hezron E. Williams
*Attorney, Agent, or Firm*—Epstein, Edell & Retzer

[57] ABSTRACT

Detecting and locating leaks in building service lateral sewer pipelines is accomplished under remote control by inserting a lateral inspection television camera into the lateral pipeline from a main sewer pipeline. The lateral inspection camera is stored in a generally cylindrical launcher mechanism having a camera port opening through which the lateral camera may be projected and retracted using a hollow elongated and flexible push rod. The launcher is moved longitudinally in the main pipeline, along with a main television camera, until an entrance opening to a service lateral pipeline is viewed via the main camera. The launcher mechanism may also be rotated in order to properly align the camera aperture with the entrance to the lateral pipeline. The lateral camera can be propelled into the lateral pipeline by means of motor driven pinch rollers in the launcher mechanism pushing the push rod. Electrical power and video signals for the miniature camera are transmitted through a cable disposed within the push rod. An electronic switch is disposed in the launcher mechanism and is selectively actuable from a remote control station to effect alternative transmission of the lateral camera video signal and the main camera video signal to the remote control station.

29 Claims, 5 Drawing Sheets

METHOD AND APPARATUS FOR INSPECTING LATERAL LINES

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to a method and apparatus for inspecting building service lateral connection lines in sewer systems. More particularly, the present invention relates to a method and apparatus for detecting and locating leakage-causing defects in building service lateral sewer lines.

2. Discussion of the Prior Art

Most localities have long been plagued by massive amounts of non-sewage water that taxes the capacities of water treatment facilities, which capacities might otherwise be more than sufficient to handle the actual sewage generated by the area population. Inflow (i.e., water entering the system from roof leaders, storm drains and other sources as a result of rainfall) and infiltration (i.e., the ground water entering the system through defects in pipes, joints, service connections, and manholes) account for as much as 35% of the water transported to treatment plants. The cost of transportation and treatment of this extraneous flow can run into the millions of dollars per year.

It has been found that most of the infiltration in sewer collection systems results from leaks in building service lateral sewer pipes. Conventionally, identification and repair of leaks in service laterals requires excavation and/or access to the buildings serviced by the laterals. This approach is costly as well as disruptive of activities in and around the building. An improved method and apparatus for sealing leaks in building service lateral sewer pipes is described and illustrated in U.S. Pat. No. 4,484,602 (Guthrie). Also described in that patent is a technique for detecting leaks in a service lateral whereby: the main sewer pipe is sealed at opposite sides of the lateral entrance; an inflatable elongated tube is extended into the lateral pipe to create a seal against the inner surface of the lateral remote from the entrance but creating an annular space between the tube and the lateral pipe intermediate the entrance and the seal; pressurized gas is delivered to the annular space; and a pressure transducer monitors the pressure in the annular space to determine whether or not a leak is present in the pipe. This leak detection approach has limitations in that it cannot pinpoint the location of a detected leak, and the pressure transducer is often not sufficiently sensitive to detect very small pressure changes caused by very small leaks.

OBJECTS AND SUMMARY OF THE INVENTION

It is an object of the present invention to provide a method and apparatus for detecting and locating leaks in building service lateral sewer pipes.

It is another object of the present invention to provide an environmentally acceptable method and apparatus, which is also acceptable to building owners and users, for detecting and locating leaks in building service lateral sewer pipes.

Still another object of the present invention is to provide a method and apparatus for detecting and locating leaks in building service lateral sewer pipes without requiring excavation or disruption of use of the building served by the pipes.

It is a further object of the present invention to provide a method and apparatus for detecting and locating leaks in building service lateral sewer pipes from a location in a sewer main without requiring that a section of the main be sealed on opposite sides of the entrance to the lateral.

Yet another object of the present invention is to provide a method and apparatus for detecting and locating leaks in building service lateral sewer pipes internally from a sewer main line as part of a normal section-by-section inspection program of the overall collection system.

In accordance with the present invention a lateral inspection system uses closed circuit television to detect and locate leaks in a building service lateral sewer pipe. The system includes three main components: a lateral inspection camera; a main line inspection camera; and a lateral camera launcher. The inspection process involves inserting the main line inspection camera, with the lateral camera launcher attached, into the sewer main via access manholes. Once in the pipeline, the devices are slowly pulled via a winch cable through the pipeline until the building service lateral to be inspected is observed, via the main line closed circuit television camera, on a receiving monitor located above ground in a mobile studio. Utilizing the main-line camera to locate and position the lateral camera launcher, the opening from the main line to the lateral is aligned with an opening in the launcher from which the lateral inspection camera exits from the launcher and enters the building service lateral. Alignment is accomplished by moving the launcher longitudinally forward or backward in the main sewer line and by rotating the center segment of the launcher about the launcher axis.

Once the launcher opening is aligned with the building service lateral, the lateral inspection camera is propelled into the lateral pipe. The lateral inspection camera is propelled by means of two sets of pinch rollers, driven by variable speed and reversible electric motors, pushing a coiled flexible push rod. This push rod contains all electric wiring for the lateral camera. When the lateral inspection camera is in the totally retracted position (i.e., contained inside the launcher), the push rod extends rearwardly from the back to the launcher and rests in the main sewer pipe. When the lateral inspection camera begins its entry into the building service lateral, the video signal, camera power and lighthead power are electronically switched within the launcher from the main line inspection camera to the lateral inspection camera. This condition is maintained as the lateral inspection camera is propelled up through the building service lateral pipe to the full extent of the push rod. After the push rod is fully retracted, and with the lateral inspection camera resting inside the launcher, video signal is switched back to the main line inspection camera. The devices are then pulled forward and positioned at the next building service lateral to be inspected. The process is repeated as desired until all of the building service laterals within the manhole reach have been inspected.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings, wherein.

DESCRIPTION OF THE PREFERRED EMBODIMENTS

Figure 1:
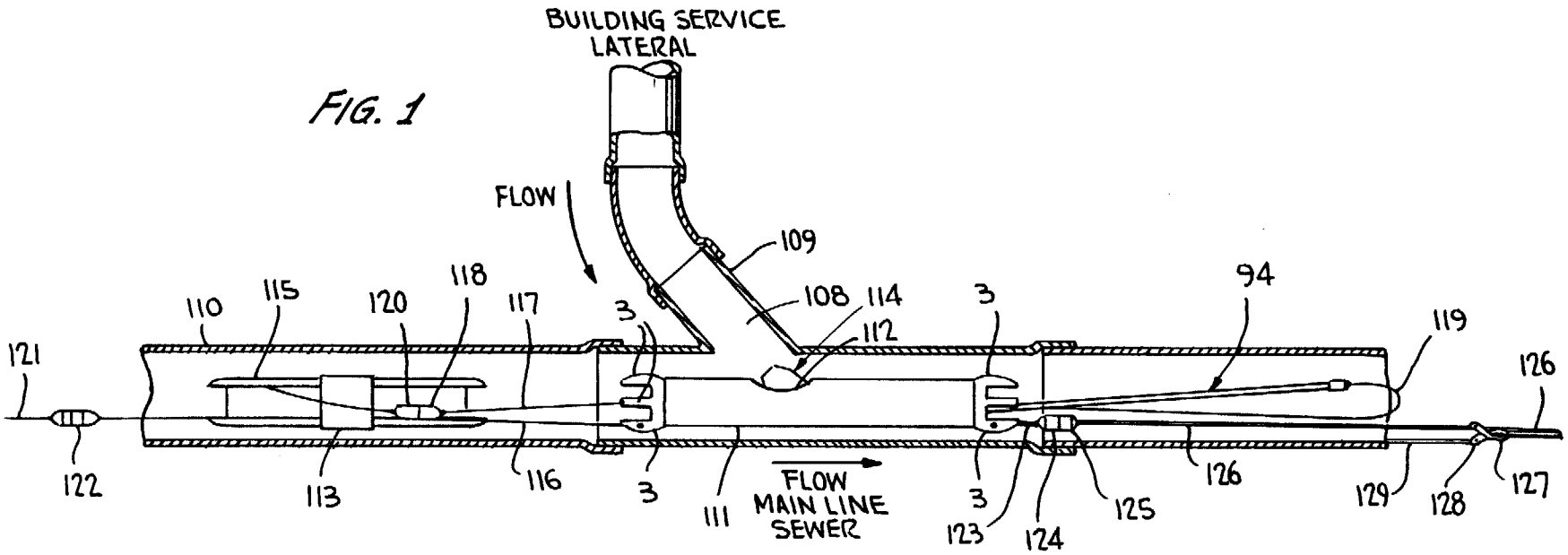
FIG. 1 is a diagrammatic illustration of the lateral inspection system of the present invention deployed in a main sewer line adjacent an opening to a building service lateral line to be serviced.

Referring specifically to FIG. 1 of the accompanying drawings, a main sewer line is generally designated by the reference numeral 110 and has a building service lateral pipeline 109 extending therefrom. The flow in the main line 110 is in the direction from left to right as viewed in FIG. 1. The lateral line 109 is oriented at an angle (i.e., typically 45°) to the main line 110, as in the case with most present day sewer line systems. This angling of the lateral pipeline relative to the main line is done in order to permit orderly flow into the main line without a back-up of solid sewage at the opening 108 at which the main and lateral lines intersect.

A lateral camera launcher mechanism 111, described in greater detail hereinbelow, is disposed in the main line 110 and includes a camera aperture 112 aligned with the lateral opening 108 in a manner described subsequently. The launcher 111 has a generally cylindrical configuration with conventional skid members 3 disposed at opposite ends to facilitate smooth translation of the launcher along the interior walls of the main pipeline 110. The portion of the launcher mechanism intermediate the skid members 3 is rotatable about the longitudinal axis of the launcher mechanism (and the longitudinal axis of the main pipeline when the launcher mechanism is deployed therein) relative to the skid members. A miniature camera 114 is shown diagrammatically projecting from camera aperture 112 in the rotatable portion of the launcher housing. The distal end of miniature lateral camera 114 is secured to one end of a push rod 94. This push rod takes the form of a hollow elongated coiled steel cable used to push camera 114 through lateral opening 108 and along the lateral pipeline 109. For this purpose, the push rod 94 must have sufficient longitudinally compressive rigidity as not to buckle when pushing the camera through the lateral pipeline. In addition, push rod 94 must have sufficient transverse flexibility to permit the rod to follow bends of at least 90° in the lateral pipeline 109. In the fully retracted position of camera 114, as illustrated in FIG. 1, push rod 94 extends out from the rearward end of launcher mechanism 11.

An electrical cable 119 provides electrical connections between circuitry located within launcher mechanism 111 and camera 114. This cable 119 is disposed within push rod 94 and extends from the open end of the push rod 94, remote from camera 114, and into the launcher mechanism 111.

A main line television camera 113 is mounted on a sled 115 to permit camera 113 to be smoothly translated longitudinally along the main pipeline 110. A pair of tow lines 116 (only one illustrated in FIG. 1) extend between the forward skid members 3 of launcher mechanism 111 and sled 115 so that, if the sled is pulled upstream in the main pipeline 110 (i.e., to the left in FIG. 1), the launcher mechanism 111 is towed by the sled 115. Main camera 113 is secured to as to view portions of the interior wall of main pipeline 110 which surround the launcher mechanism 111. The use of such television cameras as part of a closed circuit television system in conjunction with sewer line inspection and packing systems is well known, as described in U.S. Pat. No. 4,484,602 and in U.S. Pat. No. 3,750,711. The lens of camera 113 has a sufficiently wide viewing angle to permit observers at a remote television monitor to determine when the camera aperture 112 in the launcher mechanism is longitudinally aligned with lateral opening 108. The television monitor is typically located in a van or other remote control operator station disposed above-ground proximate an access manhole.

Electrical connections between the circuitry within launcher mechanism 111 and camera 113 is provided by means of a cable 117 having a female cable connector 118 at its distal end. Connector 118 mates with a male connector 120 disposed at the camera assembly. A tow line 121 is secured to the forward end of sled 115 by means of a tow cable snapswivel connection 122. Tow cable 121 permits the sled 115 and camera 113 to be towed in an upstream direction in main line 110. As described above, tow lines 116 cause the launcher 111 to be towed along with the camera and sled.

At the downstream end of the launcher, an electrical cable 123 extends from the launcher to a female cable connector 124. Cable 123 carries all of the electrical connections required between the remote operator control station (not illustrated) and each of the launcher mechanism, lateral camera 114, and main camera 113. A female cable connector 124 is secured to cable 123 and mates with a male cable connector 125 secured to a further electrical cable 126. Cable 126 carries all of the connections back to the remote control station. A strain relief device 127, conventional in nature, prevents rupture of the cable during a towing procedure. Cable 126, downstream of the strain relief device 127, serves as a tow cable for permitting the launcher mechanisms 111 and main camera sled 115 to be pulled back toward the access manhole proximate the remote control station. A tow cable snapswivel member 128 is disposed proximate the stain relief member 127 and includes a separate extension portion of the tow cable which connects to the downstream skid members 3 of launcher mechanism 111. In this manner, the entire assembly may be pulled downstream by exerting forces (to the right in FIG. 1) through electrical cable 126 and tow cable 129.

In deploying the system illustrated in FIG. 1, tow cable 121 at the upstream end of the system is engaged by a winch located at an upstream access manhole. The components illustrated in FIG. 1 are positioned at a downstream manhole at which the mobile monitoring station is located. The winch is then actuated by the operator in the remote control station to pull the assembly until the video image on the monitor from camera 113 indicates that the camera aperture 112 launcher mechanism 111 is longitudinally aligned with a lateral opening 108 for a building service lateral pipeline. At such time, the towing is terminated and the central portion of the launcher mechanism housing is rotated to angularly align camera aperture 112 with lateral opening 108. Again, this procedure is viewed by the operator at the remote control station and controlled accordingly. The operator can select the image viewed by either of cameras 113 and 114 for viewing on his/her monitor and, accordingly, can utilize either image as part of the longitudinal and angular alignment procedures.

When the camera aperature is both longitudinally and angularly aligned with the lateral opening 108, the operator actuates the push rod drive components located in the launcher mechanism, under remote control, to extend the camera 114 and push rod 94 into the lateral pipeline 109. The video image transmitted by the miniature lateral camera 112 permits the operator to observe the interior wall of the lateral pipeline in order to detect the presence of leaks. After the entire lateral pipeline 109 has been inspected, the push rod is retracted until the camera is withdrawn into the camera aperture 112 at the launcher mechanism. The winch may then be actuated once again to pull the entire system, via tow cable 121, until another lateral pipeline is observed in the image provided by camera 113.

The push rod 94 is a spirally coiled rod of the type commonly used with sewer maintenance equipment. The center of the rod is hollow to permit the electrical cable 119 to be disposed therein and provide electrical connections between camera 113 and circuitry within the launcher 111.

Figure 2:
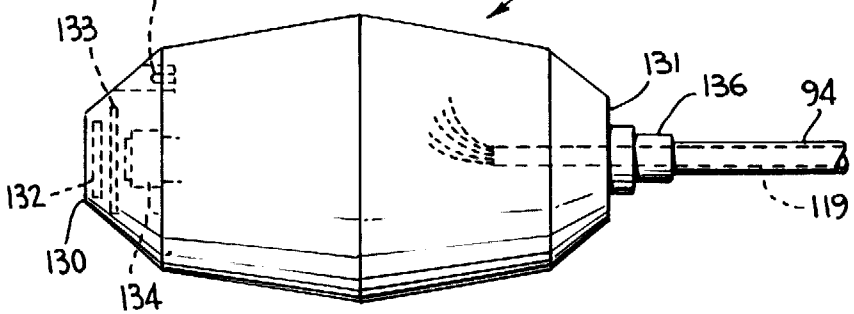
FIG. 2 is a side view in partial phantom of a lateral inspection camera employed as part of the system of FIG. 1.
Figure 3:
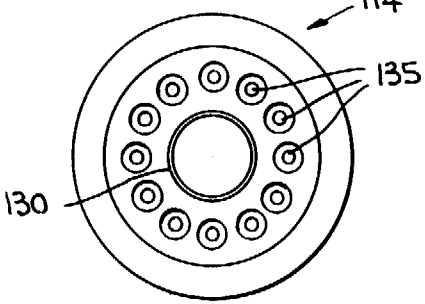
FIG. 3 is a front view of the camera of FIG. 2.

The miniature lateral camera 114 is illustrated in FIGS. 2 and 3 and is shaped to be widest approximately at its longitudinal midpoint while tapering in stepped increments toward both its distal end 130 and proximal end 131. The open distal end 130 is covered by a protective glass window 132 behind which is disposed an infrared filter 133 in front of a lens 134. In the preferred embodiment, lens 134 is an eight millimeter lens. A plurality of lamps 135 are recessed at the forward or distal end 130 and are provided to illuminate the field of view of lens 134. In the illustrated embodiment, ten lamps 135 are provided in a circular array with alternate lamps being directed substantially straight ahead (i.e., parallel to the optical axis of lens 134) while the remaining lamps are angled to project their light beams at a divergent angle from the lens optical axis of approximately ten degrees. In this manner, the interior walls of the lateral pipeline can be adequately illuminated.

At the rearward or proximal end of camera 114 there is provided a fitting 136 at which the push rod 94 is rigidly connected to the camera. Cable 119 extends through the fitting and into the camera body so that the individual electrical leads may be appropriately connected to the circuitry within the camera. As noted above, this circuitry is conventional and need not be described herein in detail.

Figure 4:
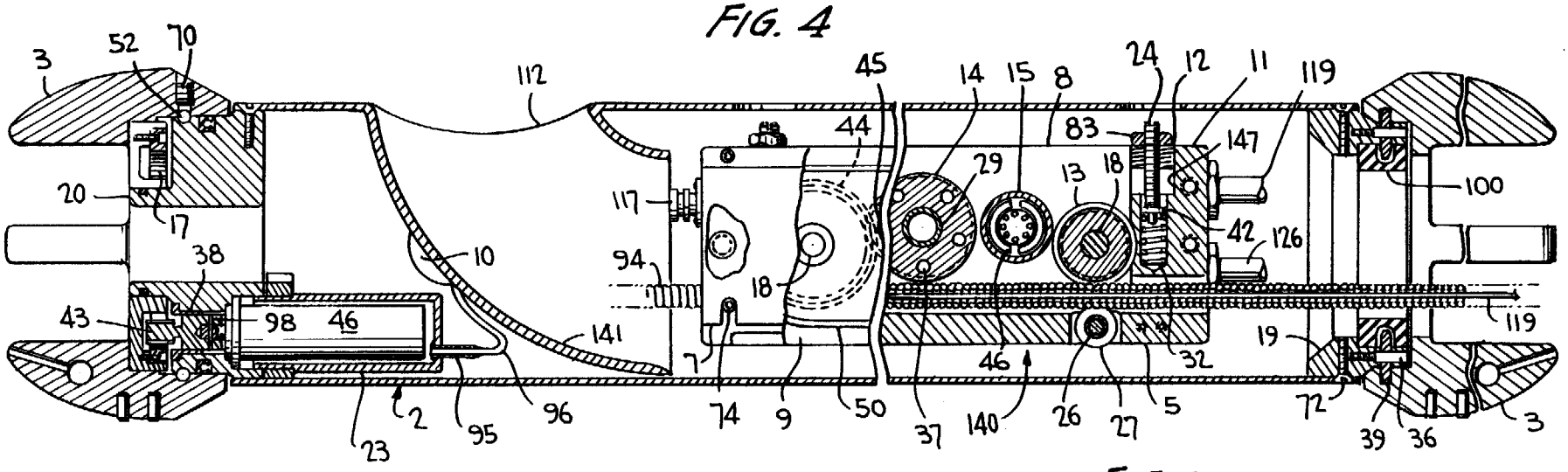
FIG. 4 is a broken side view in partial section of the launcher assembly, including the assembly housing, employed in the system of FIG. 1.
Figure 6:
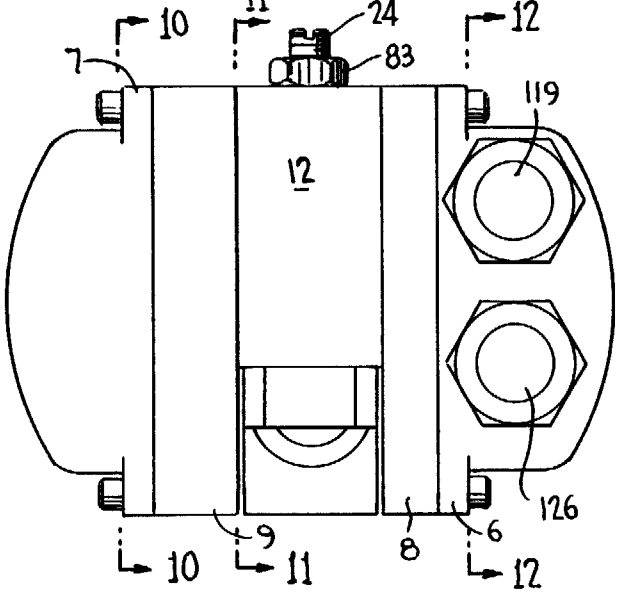
FIG. 6 is an end view of the launcher unit of FIG. 5.
Figure 5:
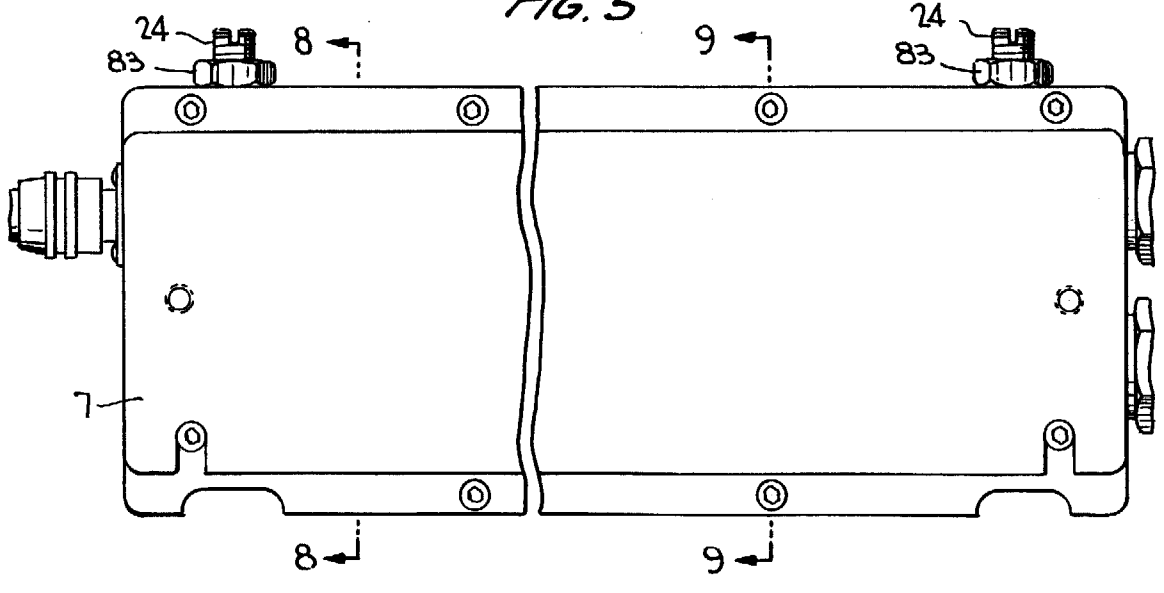
FIG. 5 is a side view of the launcher unit employed in the assembly of FIG. 4.
Figure 7:
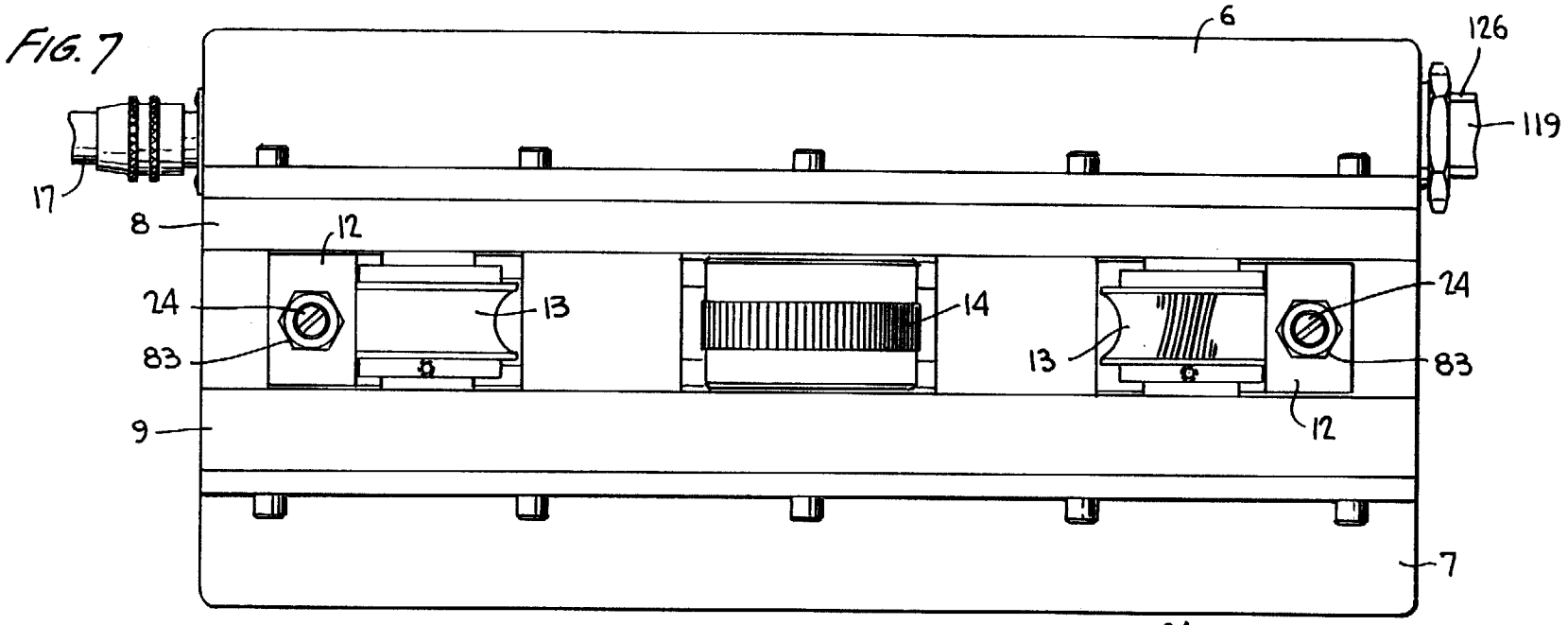
FIG. 7 is a top view of the launcher unit of FIG. 5.
Figure 9:
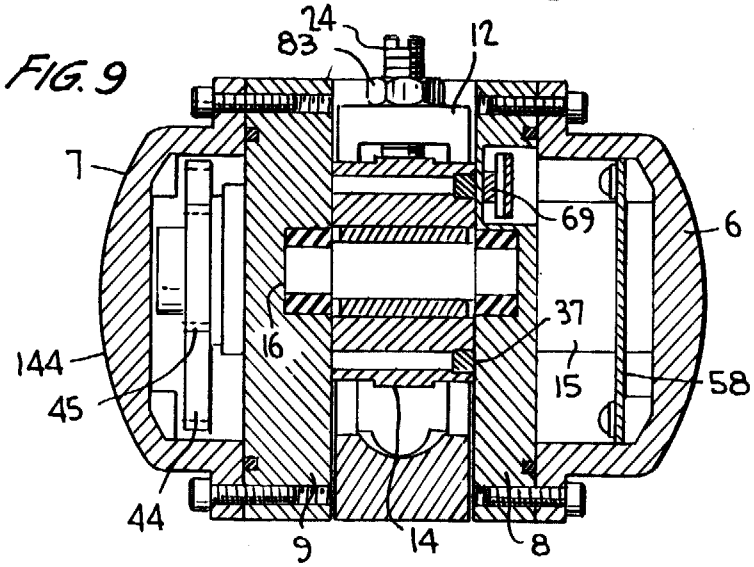
FIG. 9 is a view in section taken along lines 9—9 of FIG. 5.

Referring now to FIG. 4 of the accompanying drawings, the launcher assembly 111 includes the launcher drive unit 140 disposed within a launcher housing. The launcher housing includes the skid members 3 at either end of the housing and a rotatable hollow cylindrical member 2. Camera aperture 112 is defined in the hollow cylindrical member 2 and is the termination of an arcuate passage 141 having its other end facing axially of the cylindrical member toward the downstream end of the launcher assembly. As illustrated in FIG. 4, passage 141 guides push rod 94 through camera aperture 112 during extension and retraction of the push rod and camera. A reversible gear motor 46 is disposed within a motor housing 23 inside cylindrical member 2 proximate the upstream end of the launcher assembly. Motor housing 23 is provided with an opening in which an electrical cable fitting 95 is secured to receive a power cable 96 for energizing motor 46. Cable 96 is connected to the printed circuit board in the launcher unit 140 and extends around passage 141. Access to fitting 95 is achieved by an appropriately provided window opening 10 disposed in cylindrical member 2. The drive shaft of motor 46 is connected to a drive gear 43 by means of a spring pin 98. Drive gear 43 extends from a motor mounting bulkhead 20 to engage an internal plug gear 17 to effect rotation of the cylindrical member 2 and bulkhead 20 relative to the skid members 3. Ball bearings 52, held in place by set screws 70, provide the bearing arrangement at the upstream end of the assembly. The bearing at the downstream end of the assembly is provided by four bearing rollers 39 disposed about respective roller retainer screws 36. The retainer screws engage an annular bearing ring 19 secured to the cylindrical member by screws 72. The bearing rollers 39 are received in appropriate notches provided in the skid members 3 at the downstream end of the assembly. An annular sponge rubber guard 100 is disposed radially interiorally of the bearing rollers 39.

When motor 46 is energized, the cylindrical member 2, which is normally spaced from the interior wall of the main sewer line 110 by the skid members 3, is caused to rotate relative to the skid members which are prevented from movement by the weight of the assembly bearing against the interior wall of the main line 110 through the skid members.

Figure 8:
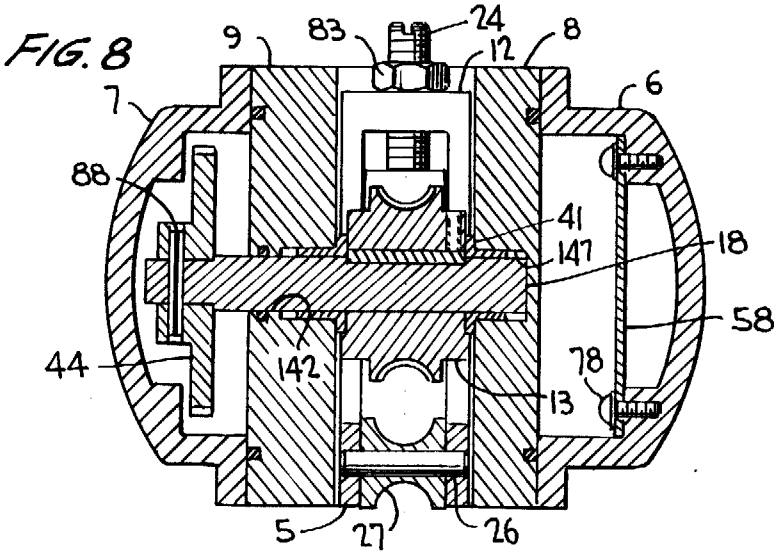
FIG. 8 is a view in section taken along lines 8—8 of FIG. 5.
Figure 10:
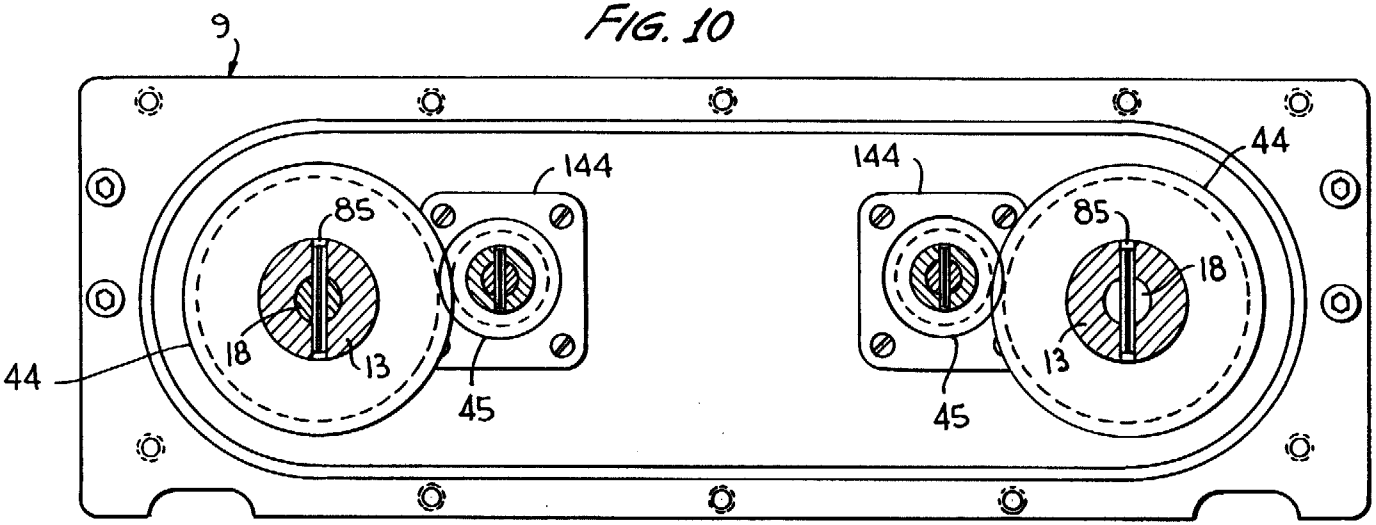
FIG. 10 is a view in section taken along lines 10—10 of FIG. 6.
Figure 11:
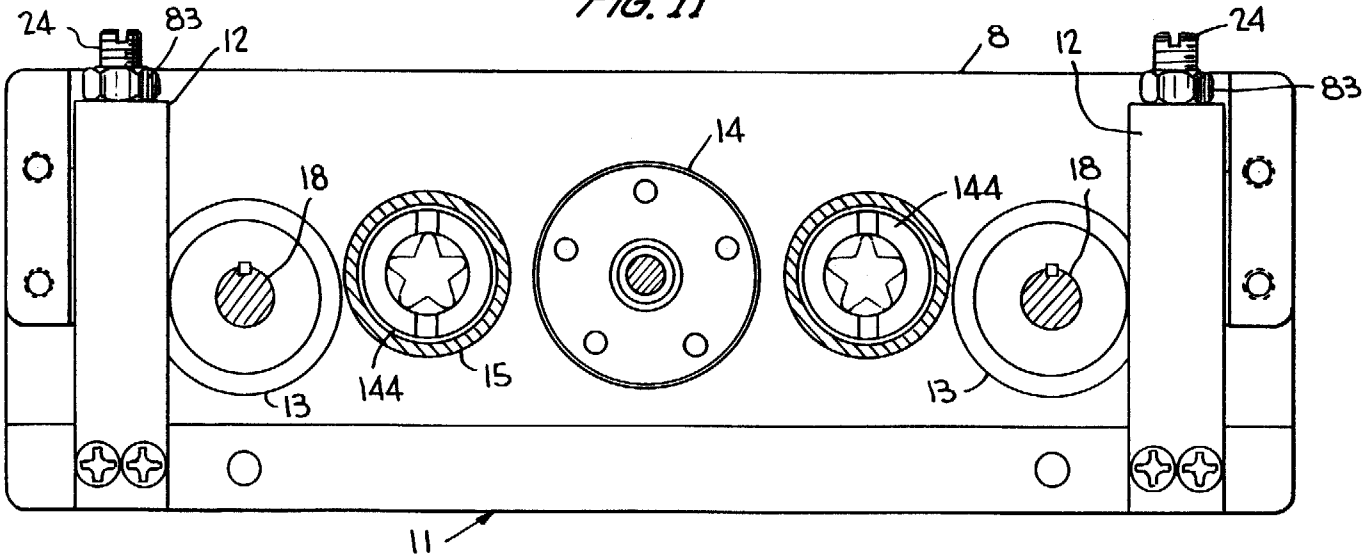
FIG. 11 is a view in section taken along lines 11—11 of FIG. 6.
Figure 12:
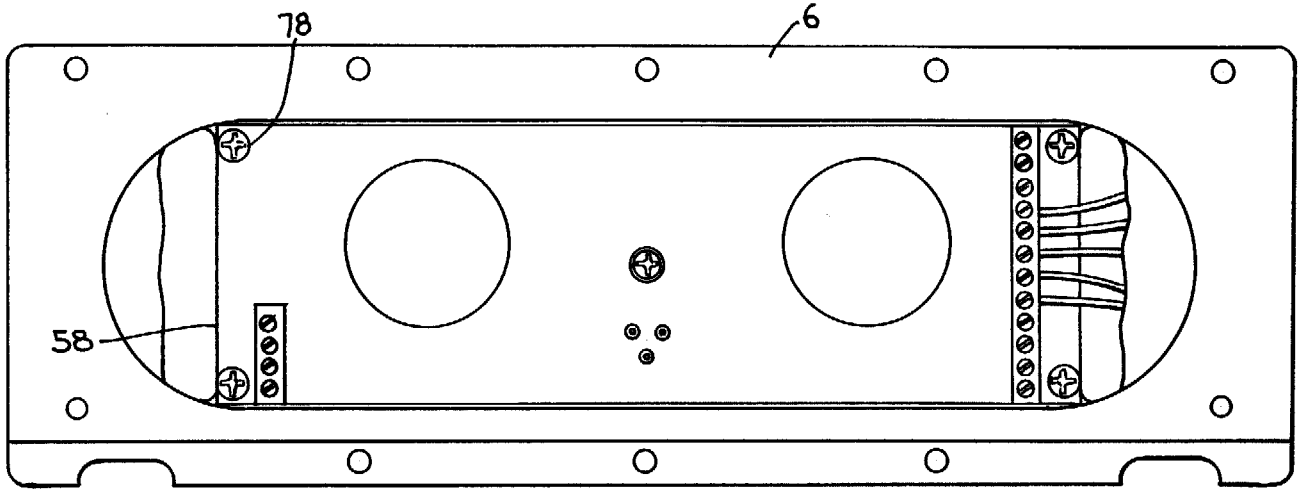
FIG. 12 is a view in section taken along lines 12—12 of FIG. 6.

The launcher assembly is illustrated in detail in FIGS. 4–12 to which specific reference is now made. To side plates 8 and 9 have a generally rectangular configuration and are disposed in spaced parallel relation. The two plates support a magnetic counting wheel 14 and two drive wheels 13 between them. Each drive wheel, as best illustrated in FIG. 8, is supported on a respective drive wheel shaft 18. For each drive wheel shaft 18, there is a cylindrical recess 147 defined in plate 8 and facing a generally cylindrical bore 142 defined through plate 9. Appropriate bushings 41 are disposed in recess 141 and bore 142, and rotatably support shaft 18. The shaft extends through plate 9 into a space defined by a drive gear cover plate 7 and is secured to a drive gear 44 by means of a spring pin 85. Gear 44 is driven by a motor drive gear 45 secured to the drive shaft of a motor 144. The gear engagement between the motor drive gear 45 and the drive spur gear 44 is effected within the space defined by cover plate 7 and plate 9. Drive wheel 13 is secured about shaft 18 between plates 8 and 9 and is rotatable with shaft 18. Each drive wheel 13 is associated with a respective pinch roller 27 mounted on a corresponding pinch roller shaft 26 between a pinch roller rail assembly 5 disposed between plates 8 and 9. Push rod 94 is normally disposed between the drive wheels 13 and their corresponding pinch rollers 27 and in this way is propelled in either direction, depending upon the direction in which the drive wheels are rotated. The motors 144 are secured to plate 9 with the motor housing disposed between plates 8 and 9 and the motor drive shaft extending into the space defined between cover plate 7 and plate 9. In fact, the motor cover tubes 15 extend through appropriate bores defined in plate 8 into the space defined between cover plate 6 and plate 8. Cover plate 6 is on the opposite side of the unit from cover plate 7 and defines a space for the electronic circuitry.

The magnetic counting wheel 14 is disposed substantially at the longitudinal center of the launcher unit 140 between the two motors 144. Magnetic counting wheel 14 is disposed entirely between plates 8 and 9 and is free wheeling about a shaft 16 extending between opposed cylindrical recesses defined in plates 8 and 9. A cylindrical bearing 29 is disposed between the shaft and the interior surface of wheel 14. A plurality of magnets 37 are recessed in the surface of wheel 14 which faces plate 8. Magnets 37 are oriented in a circular array with equal angular spacing between them. In the particular embodiment illustrated herein, five such magnets are disposed at the same radial distance from the center of shaft 16 with angles of 72° between successive magnets. Appropriate bores are defined in the counting wheel 14 to receive the magnets so that the magnets reside flush with the surface of counting wheel 14 which faces plate 8. A Hall effect device 69 is disposed in a suitably provided hole defined in plate 8 at a distance from the rotational axis of magnetic counting wheel 14 which corresponds to the radial spacing of the magnets 37 from that axis. The Hall effect device 69, which is a magnetic pick-up device, is thus positioned to sense the passage of each magnet past the device as the magnetic counting wheel rotates. By way of example only, the magnetic Hall effect may be the device designated by Serial Number UGN 3020T, manufactured by the Sprague Manufacturing Company. Magnetic counting wheel 14 is mounted for free rotation between plates 8 and 9 and is rotated by push rod 94 as it is extended and/or retracted by drive wheels 13 under the control of motors 144. Thus, as the push rod 94 is translated through the launcher unit 140, a pulse is provided by the magnetic pick-up unit 69 for each 72° of rotation of wheel 14 as induced by the moving push rod 94. In a practical embodiment of the invention, the radial spacing of the magnets 37 and magnetic pick-up device 69 from the axis of wheel 14 is selected so that the magnetic pick-up device 69 provides an output pulse after each one half foot of length of push rod 94 is extended or retracted. These pulses may be counted by an appropriate electronic pulse counter at the remote control station so that the accumulated pulse count provides a measure of the amount of push rod 94 extension and/or retraction.

At each end of launcher unit 140 there is disposed a spring housing member 11 between plates 8 and 9. A hole 147 is provided at the top of spring housing 11 and includes a countersunk bore portion at its lower end. A helical compression spring 32 is disposed in the countersunk portion and a spring compression pin 42 is disposed atop the spring. A yoke member 12 is located over the spring housing, as best illustrated in FIG. 8, and has four holes at its bottom which align with corresponding holes in the pinch roller rail assembly 5. The yoke 12 and pinch roller rail assembly 5 are joined by means of screws inserted through the aligned holes. A spring compression screw 24 is inserted into hole 147 by threadedly engaging yoke 12 through a threaded hole defined through the top of the yoke. A nut 83 threadly engages the exposed end of the spring compression screw 24. The spring compression screw 24 can be adjusted against the spring force exerted by spring 32 to move the pinch roller rail 5 closer to or further away from the drive wheels 13. In this manner, the pinch rollers 27, engaged in the pinch roller rail 5, can be spring loaded against the push rod 24 with the desired amount of force.

The space between side plate 8 and cover plate 6 contains the electronics portion of the launcher unit 140. A printed circuit board 58 is secured to cover plate 6 by means of screws 78. Wires from cables 119 and 126 are delivered to the printed circuit board, the motors 144 and motor 46. The electrical circuitry associated with the launcher unit 140 is illustrated in schematic form in FIG. 13 described in the following paragraphs.

Figure 13:
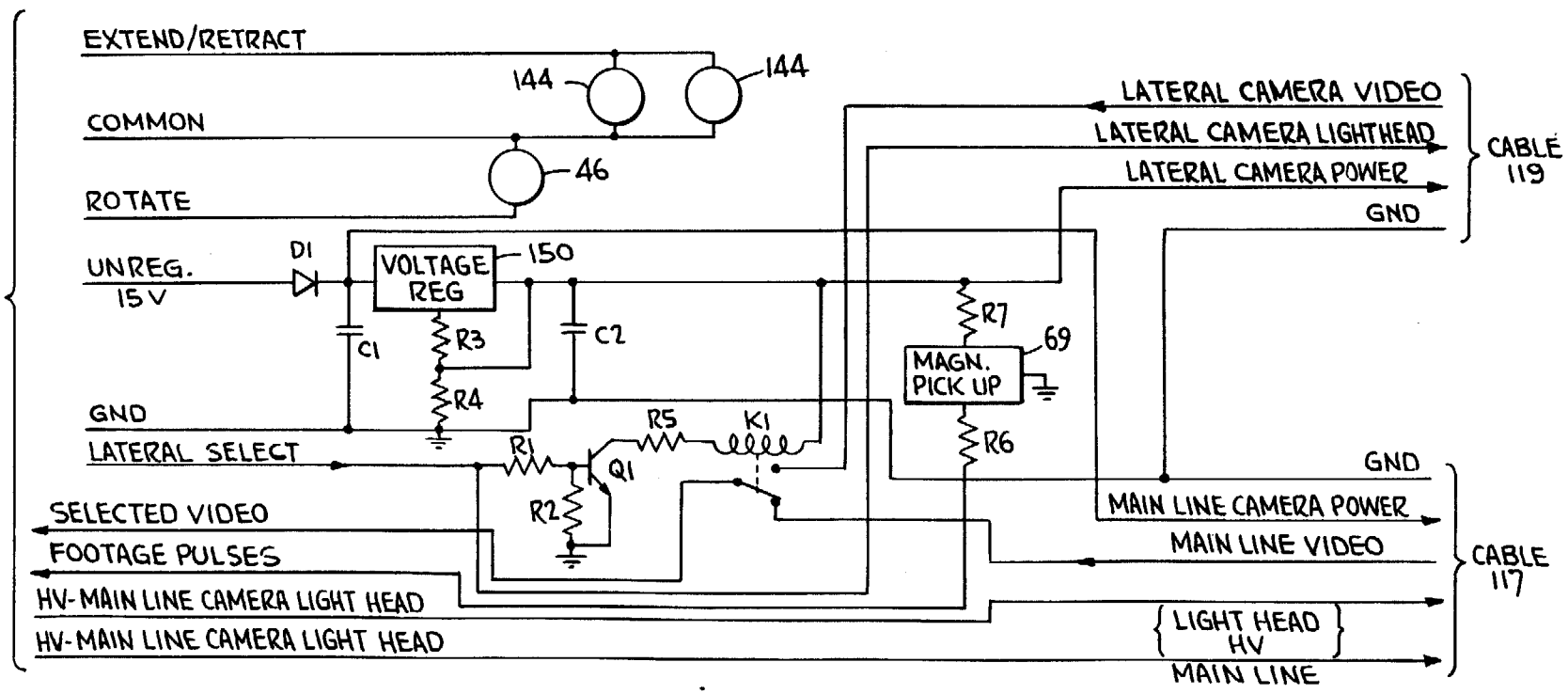
FIG. 13 is a schematic diagram of the electrical circuit employed in the launcher assembly of FIG. 4.

The lefthand side of FIG. 13 represents electrical signals connecting the remote control operator station with the launcher unit 140, the lateral camera 114 and the main camera 113. The EXTEND/RETRACT control energizes both motors 140 simultaneously. The voltage provided by this signal can be polarized positive and negative, alternatively, to effect the desired rotational direction in the motor. The ROTATE signal can also have both polarities and thereby drives the rotate motor 46 in either of two directions. Thus, rotation of cylindrical member 2 relative to skid members 3 can be in either direction.

An unregulated 15 volt power line, with positive polarity, is delivered through a diode D1 to a voltage regulator unit 150. External connections to the voltage regulator include capacitors C1, C2 and resistors R3 and R4. Voltage regulator 150 provides a regulated 12 volt d.c. line for use in the circuit. The unregulated voltage, at the output of diode D1, is applied to the main line camera 113 as the primary operating power for that camera.

The magnetic pick-up 69 receives the regulated 12 volt power through a resistor R7 and supplies its output pulses, designated FOOTAGE pulses, through a resistor R6. As noted above, these pulses may be counted at the remote control station as a measure of the length of push rod 94 which has been extended or retracted.

An NPN transistor Q1 receives a Lateral Select signal at its base through resistor R1. A resistor R2 is connected between the base and emitter electrodes with the emitter side of the transistor being connected to ground. The collector of transistor Q1 is connected through resistor R5 to one side of a relay coil K1. The other side of relay coil K1 is connected to the +12 volt regulated voltage supply line. The arm of the contact for relay K1 is connected to the SELECTED VIDEO signal line which provides a video signal from the system to the remote control station. The state of relay K1 determines whether the video signal from the lateral camera or the video signal from the main camera is transmitted back to the remote control station as the selected video signal. When the voltage on the lateral select line is below the switching threshold of transistor Q1, relay K1 is un-energized, permitting the main camera video signal to be transmitted to the remote control station. When the lateral select signal, as controlled from the remote control station, is more positive than the switching threshold for transistor Q1, relay K1 is energized and switches the lateral camera video signal onto the selected video line. The LATERAL SELECT signal is also utilized as the energizing signal for the lights 135 at the lateral camera 114. Thus, upon energization of the lights at the lateral camera, the video signal is automatically switched from the main camera to the lateral camera.

Also illustrated in FIG. 13 are the high voltage light energizing signals for the main camera. These signals pass through the launcher unit 140 and onto the main camera 113 via cable 117.

The invention as described has been utilized to propel the lateral camera into a building service lateral sewer pipe as small as 4 inches in diameter. The only limitation on the minimum size pipeline is the corresponding dimension of the lateral camera. It is contemplated that the invention has applicability for any size lateral pipeline if a camera can be made small enough to traverse that line. In any event, the camera is pushed through the lateral line by actuating both drive motors 144 from the remote control station in the same direction. Motor gears 45 then drive the gears for drive wheels 13. The drive wheels are thusly driven in the same direction to propell push rod 94 and camera 114 into the lateral pipeline 109. Magnetic counting wheel 14 is rotated by the push rod 94 as the push rod is translated through the launcher unit 140. Rotation of magnetic counting wheel 14 causes the magnetic pick-up unit 69 to provide a pulse as each magnetic 37 in wheel 14 passes the magnetic pick-up unit. When the lights 135 on the lateral camera 114 are energized, the video signal received at the remote control station is switched from the main camera video to the lateral camera video. After the lateral line 109 has been inspected via the lateral camera 114, the direction of motors 144 may be reversed by reversing the polarity of the voltage applied thereto from the remote control station. This serves to drive the drive wheels 13 in the opposite direction to retract the push rod 94 from the lateral line 109.

From the foregoing description it will be clear that we have provided a unique method and apparatus for permitting inspection of building service lateral lines from a main sewer line without requiring excavation. The location of any leaks in the lateral line may be detected and precisely located by observation through a closed circuit television camera. This is much more advantageous than simply detecting the presence of a leak, using pressure transducers, without determining the precise location of that leak. Importantly, the electrical connections required for the lateral camera can be enclosed in the push rod 94 which moves the camera in and out of the lateral line.

While we have described and illustrated a specific embodiment of our invention, it will be clear that variations of the details of construction which are specifically illustrated and described herein may be resorted to without departing from the true spirit and scope of the invention as described in the appended claims.

What is claimed is:

1. Apparatus for inspecting a building service lateral sewer pipeline from a lateral opening in a main sewer [pipeline] *pipeline* at which the lateral [end] *and* main pipelines intersect, said apparatus comprising:

a lateral television camera of sufficiently small size to fit in said lateral pipeline;

a lateral signal conduction cable connected to said lateral camera for delivering electrical signals required to operate the lateral camera and sending a lateral video signal representing an image viewed by the lateral camera;

a hollow elongated flexible push rod having a first end secured to said lateral camera and a second end, said push rod having a sufficient longitudinally compressive rigidity to push said lateral camera along said lateral pipeline when moved longitudinally into said lateral pipeline, and sufficient transverse flexibility to follow bends in said lateral pipeline when moved longitudinally into said lateral pipeline;

wherein said lateral cable is disposed inside said hollow push rod;

launcher means, movable longitudinally in said main pipeline, for selectively extending said lateral camera and push rod into, and retracting said lateral camera and push rod from, said lateral pipeline through said opening from said main pipeline; and means for selectively transmitting said lateral video signal along said main pipeline to a control station located remote from said lateral pipeline.

2. The apparatus according to claim 1 wherein said launcher means includes rotatably drivable roller means for engaging and propelling said push rod alternatively in first and second longitudinal directions.

3. The apparatus according to claim 2 further comprising reversible motor means for selectively rotatably driving said roller means in two alternative rotatable directions.

4. The apparatus according to claim 3 further comprising:

monitor means for providing an electrical length measurement pulse in response to extension of each longitudinal section of predetermined length of said push rod into said lateral pipeline; and means for conducting each length measurement pulse to said control station.

5. The apparatus according to claim 1 further comprising:

a main television camera movable with said launcher means in said main pipeline for viewing the interior of said main pipeline and providing a main video signal representing an image viewed by said main camera; and switching means disposed in said launcher means and controlled from said control station for alternatively transmitting said main and lateral video signals to said control station.

6. The apparatus according to claim 5 further comprising:

illumination means on said lateral camera for illuminating the image viewed by said lateral camera, said illumination means being selectively actuable in response to an illumination signal initiated at said control station;

wherein said switching means is responsive to the absence of said illumination signal for transmitting said main video signal to said control station, and responsive to the presence of said illumination signal for transmitting said lateral video signal to said control station.

7. The apparatus according to claim 5 wherein said launcher means includes rotatably drivable roller means for engaging and propelling said push rod alternatively in first and second longitudinal directions, and further comprising reversible motor means for selectively rotatably driving said roller means in two alternative rotational directions.

8. The apparatus according to claim 5 further comprising:

monitor means for providing an electrical length measurement pulse in response to extension of each longitudinal section of predetermined length of said push rod into said lateral pipeline; and means for conducting each length measurement pulse to said control station.

9. The apparatus according to claim 5 wherein the second end of said push rod is open and extends beyond the confines of said launcher means when said push rod is in a fully retracted position relative to said lateral pipeline, said lateral signal conduction cable extending out from said open second end and into said launcher means.

10. The apparatus according to claim 1 further comprising:

a selectively rotatable portion of said launcher means having a camera port therein and rotatable about an axis extending longitudinally in said main pipeline, said camera port serving as an ingress and egress opening in said launcher means for said lateral camera and said push rod, wherein said rotatable portion is rotatable to permit angular alignment of said camera port with said lateral opening.

11. The apparatus according to claim 10 wherein said launcher means includes rotatably drivable roller means for engaging and propelling said push rod alternatively in first and second longitudinal directions, and further comprising reversible motor means for selectively rotatably driving said roller means in two alternative rotational directions.

12. The apparatus according to claim 10 further comprising:

a main television camera movable with said launcher means in said main pipeline for viewing the interior of said main pipeline and providing a main video signal representing an image viewed by said main camera; and switching means disposed in said launcher means and controlled from said control station for alternatively transmitting said main and lateral video signals to said control station.

13. The apparatus according to claim 12 wherein the second end of said push rod is open and extends beyond the confines of said launcher means when said push rod is in a fully retracted position relative to said lateral pipeline, said lateral signal conduction cable extending out from said open second end and into said launcher means.

14. The apparatus according to claim 10 further comprising:

a main television camera movable with said launcher means in said main pipeline for viewing said main pipeline and providing a main video signal representing an image viewed by said main camera;

switching means disposed in said launcher means and controlled from said control station for alternatively transmitting said main and lateral video signal to said control station;

sled means for supporting said main camera in said main pipeline; and means for connecting said sled means to said launcher means in longitudinal alignment to permit both the launcher means and sled means to be moved together longitudinally in said main pipeline;

wherein said main camera is oriented to view said launcher means and portions of the main pipeline surrounding said launcher means to permit observation of longitudinal alignment between said camera port and said lateral opening.

15. Apparatus for inspecting a building service lateral sewer pipeline from a lateral opening in a main sewer pipeline at which the lateral and main pipelines intersect, said apparatus comprising:

a lateral television camera of sufficiently small size to fit in said lateral pipeline;

a lateral signal conduction cable connected to said lateral camera for delivering electrical signals required to operate the lateral camera and sending a lateral video signal representing an image viewed by the lateral camera;

a hollow flexible push rod having a first end secured to said camera and a second end, said push rod having sufficient longitudinally compressive rigidity to push said camera along said lateral pipeline when moved longitudinally into said lateral pipeline, and sufficient transverse flexibility to follow bends in said lateral pipeline when moved longitudinally into said lateral pipeline;

launcher means, movable longitudinally in said main pipeline, for selectively extending said lateral camera and push rod into, and retracting said lateral camera and push rod from said lateral pipeline through said lateral opening from said main pipeline;

a main television camera movable with said launcher means in said main pipeline for viewing the interior of said main pipeline and providing a main video signal representing an image viewed by said main camera;

a selectively rotatable portion of said launcher means having a camera port therein and rotatable about an axis extending longitudinally in said main pipeline, said camera port serving as an ingress and egress opening in said launcher means for said lateral camera and said push rod, wherein said rotatable portion is rotatable to permit angular alignment of said camera port with said lateral opening;

sled means for supporting said main camera in said main pipeline;

means for connecting said sled means to said launcher means in longitudinal alignment to permit both the launcher means and sled means to be moved longitudinally within said main pipeline;

wherein said main camera is oriented to view said launcher means and portions of the main pipeline surrounding said launcher means to permit observation of longitudinal alignment between said camera port and said lateral opening.

16. The apparatus according to claim 15 further comprising:

monitor means for providing an electrical length measurement pulse in response to extension of each predetermined length of said push rod into said lateral pipeline, and means for conducting each length measurement pulse to a remote control station.

17. The apparatus according to claim 15 further comprising:

switching means disposed in said launcher means and controlled from a remote control station for alternatively transmitting said main and lateral video signals to said control station.

18. The apparatus according to claim 15 wherein the second end of said push rod is open and extends beyond the confines of said launcher means when said push rod is in a fully retracted position relative to said lateral pipeline, said lateral signal conduction cable extending out from said open second end and into said launcher means.

19. A method for inspecting a building service lateral sewer pipeline from a lateral opening in a main sewer pipeline at which the lateral and main pipelines intersect, said method comprising the steps of:

locating said lateral opening; aligning a camera port in a camera launching mechanism with said lateral opening;

extending a miniature television camera through said lateral opening and along said lateral pipeline by pushing said miniature camera with a hollow elongated flexible push rod secured to the miniature camera; and conducting electrical signals between said miniature camera and a launcher mechanism disposed in said main pipeline via an electrical cable disposed interiorly of said push rod.

20. The method according to claim 19 wherein said step of [detecting] *locating* employs a main television camera movable in said main pipeline with said launcher mechanism and disposed to view a portion of the main pipeline interior surrounding said launcher mechanism, said method further comprising the step of:

alternatively transmitting the video signal from said main camera and the video signal from said miniature camera to a remote control station by switching the video signals at said launcher mechanism.

*21. Apparatus for inspecting a building service lateral sewer pipeline from a lateral opening in a main sewer pipeline at which the lateral and main pipelines intersect, said apparatus comprising:*

*a lateral television camera of sufficiently small size to fit in said lateral pipeline;*

*a lateral signal conduction cable connected to said lateral camera from a remote location for delivering electrical signals required to operate the lateral camera and sending a lateral video signal representing an image viewed by the lateral camera;*

*an elongated flexible push rod having a first end secured to said lateral camera and a second end, said push rod having sufficient longitudinally compressive rigidity to push said lateral camera along said lateral pipeline when moved longitudinally into said lateral pipeline from said lateral opening, and sufficient transverse flexibility to follow bends in said lateral pipeline when moved longitudinally therein; and*

*means for selectively extending said push rod and said lateral camera along with said lateral cable into, and retracting said lateral camera and said push rod along with said lateral cable from, said lateral pipeline via said lateral opening.*

*22. The apparatus according to claim 21 wherein said push rod is hollow, and wherein said lateral cable is disposed inside said hollow push rod.*

*23. The apparatus according to claim 21 further comprising guide means, movable longitudinally in said main pipeline, for guiding said push rod into said lateral opening.*

*24. The apparatus according to claim 23 further comprising:*

*a selectively rotatable portion of said guide means having a camera port therein and rotatable about an axis extending longitudinally in said main pipeline, said camera port serving as an ingress and egress opening in said guide means for said lateral camera and said push rod, wherein said rotatable portion is rotatable to permit angular alignment of said camera port with said lateral opening.*

*25. The apparatus according to claim 21 wherein said means comprises:*

*launcher means, movable longitudinally in said main pipe line, for selectively extending said lateral camera and push rod into, and retracting said lateral camera and push rod from, said lateral pipeline through said opening from said main pipeline; and,*

*wherein said launcher means includes rotatably driven roller means for engaging and propelling said push rod alternatively in first and second longitudinal directions, and further comprising reversible motor means for selectively rotatably driving said roller means in two alternative rotational directions.*

*26. A method for inspecting a building service lateral sewer pipeline from a lateral opening in a main sewer pipeline at which the lateral and main pipelines intersect, said method comprising the steps of:*

*locating said lateral opening;*

*aligning a camera port in a camera guide with said lateral opening;*

*extending a miniature television camera through said lateral opening and along the lateral pipeline by pushing said miniature camera with an elongated flexible push rod secured to the miniature camera; and*

*conducting electrical signals between said miniature camera and a remote location via an electrical cable connected to said camera.*

*27. The method according to claim 26 wherein a lateral signal conduction cable delivers electrical signals required to operate said camera and sends a lateral video signal representing an image viewed by said camera, said method further comprising the step of:*

*extending said cable along with said camera and said push rod into said lateral pipeline via said lateral opening.*

*28. Pipeline inspection apparatus for use in inspecting a lateral pipeline that enters a generally horizontal main pipeline comprising*

*(A) an inspection camera that is sized to fit within said pipelines,*

*(A) an elongated transporting member having one end connected to said camera and which is adapted to initially move in a generally horizontal path along the interior of said main pipeline, said elongated transporting member having sufficient flexibility that a portion thereof can be deflected at an angle reflective to the remainder of the elongated transporting member,*

*(C) a supporting assembly sized to fit within and rest upon the lower internal surface of said main pipeline, said supporting assembly being arranged to support the portion of said elongated transporting member that is adjacent said camera and including*

*(I) drive means which engages said elongated transporting member so that activation of the drive means can*

*move said elongated transporting member longitudinally through said pipelines, and*

*(2) adjustment means for adjusting the angular disposition of a portion of said elongated flexible transporting member that is adjacent said camera so that the camera is movable between a transport position in which the viewing end of the camera faces a first direction, and an inspection position in which the said viewing end of the camera faces a direction at an angle to said first direction, and the camera can be propelled in said angled direction by activating said drive means, the elongated flexible transporting member undergoing a change in direction in passing through the support assembly.*

*29. Apparatus according to claim 28 wherein said drive means comprises a pair of pulleys defining a nip through which said elongated transporting member passes and a drive motor drivingly connected to one of said pulleys.*

* * * * *